United States Patent [19]

Warren

[11] Patent Number: 5,102,270
[45] Date of Patent: Apr. 7, 1992

[54] DRILL PRESS CLAMP

[76] Inventor: James Warren, P.O. Box 747, Hays, Kans. 67601

[21] Appl. No.: 705,586

[22] Filed: May 24, 1991

[51] Int. Cl.$^5$ .............................................. B23B 47/00
[52] U.S. Cl. .................................... 408/103; 269/45; 269/88; 408/109
[58] Field of Search ............... 408/95, 103, 109, 135, 408/136; 269/45, 60, 71, 58, 76, 88, 97, 249

[56] References Cited

U.S. PATENT DOCUMENTS

| | | | |
|---|---|---|---|
| 893,875 | 7/1908 | Schneider | 269/88 |
| 2,269,727 | 10/1941 | Mead. | |
| 2,271,532 | 2/1942 | Allmendinger | 408/109 |
| 2,866,367 | 12/1958 | Wilkes | 269/91 |
| 3,185,470 | 5/1965 | Zitner. | |
| 3,382,742 | 5/1968 | Gibbs. | |
| 4,505,624 | 3/1985 | Kelly, Jr. | 269/71 |

FOREIGN PATENT DOCUMENTS

| | | | |
|---|---|---|---|
| 3811026 | 10/1989 | Fed. Rep. of Germany | 408/103 |
| 26900 | 3/1924 | France | 408/103 |
| 1230641 | 5/1971 | United Kingdom | 408/109 |

OTHER PUBLICATIONS

K-Klamp brochure.

Primary Examiner—Daniel W. Howell
Attorney, Agent, or Firm—Kokjer, Kircher, Bowman & Johnson

[57] ABSTRACT

A drill press clamp having a collar which may be removably and adjustably mounted on the column of a drill press. A first arm is pivotally connected to the collar at a first end, with the second free end of the first arm pivotally mounting a second arm at a first end of the second arm. The free second end of the second arm includes a screw extending therethrough which may be employed as a clamp to secure a work piece between the drill press table and the second end of the second arm. The pivotal arrangement of the arms allows the clamp at the end thereof to be located at any point above the table. Additionally, the collar may be located at different positions along the column, to allow for work pieces of different sizes. The device may be adapted for use on a standard work table, without a drill press. The present invention also includes the use of clamp blocks having various contours cut therein. These contours may correspond to common profiles of work pieces, such that the block may be interposed between the clamp on the second arm and the work piece on the table.

18 Claims, 3 Drawing Sheets

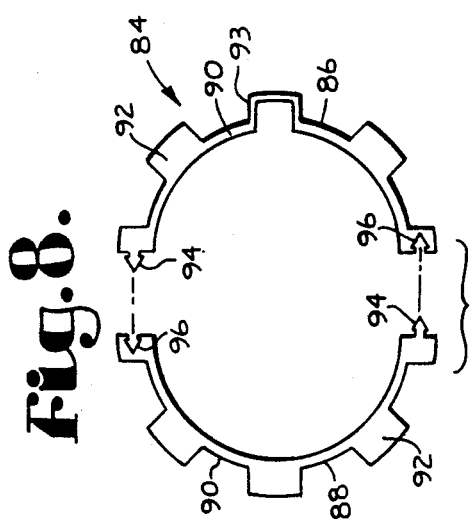
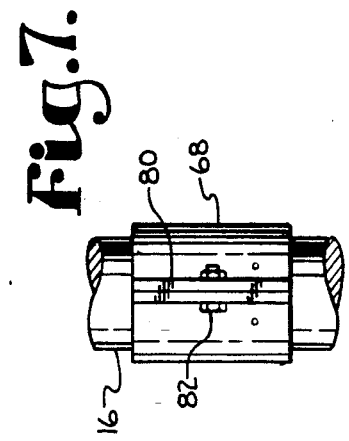
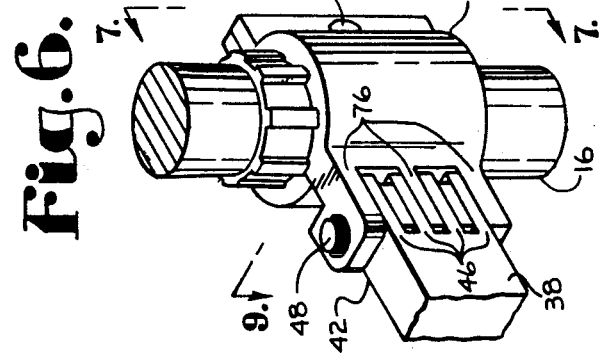
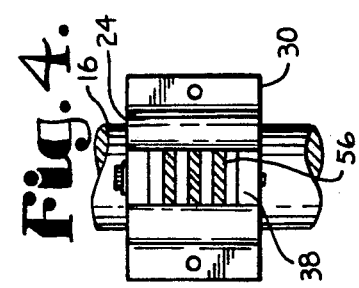
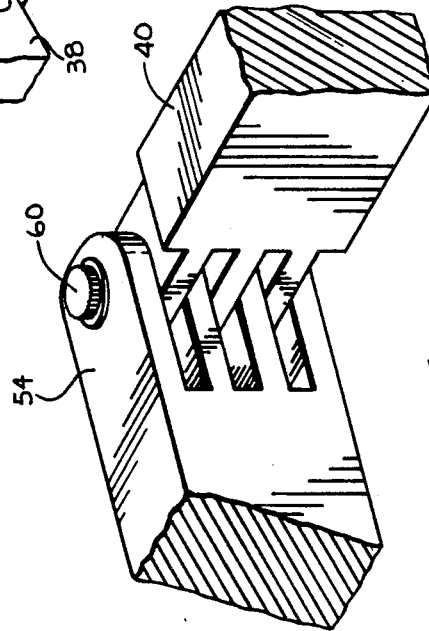

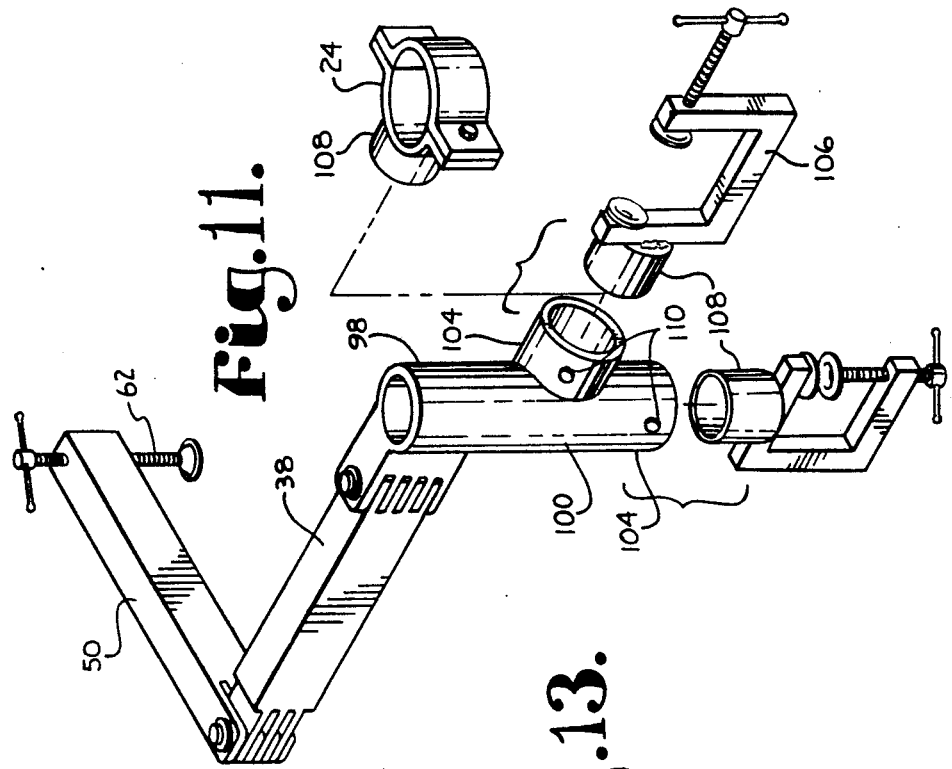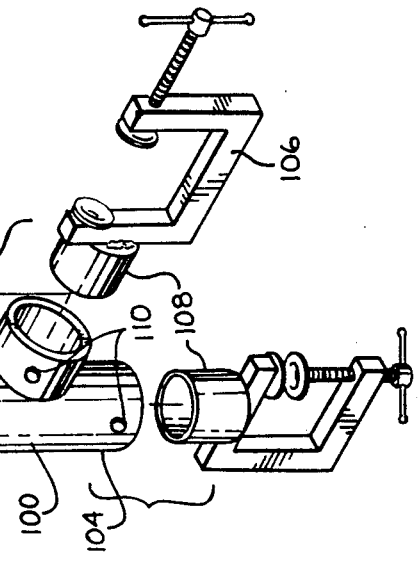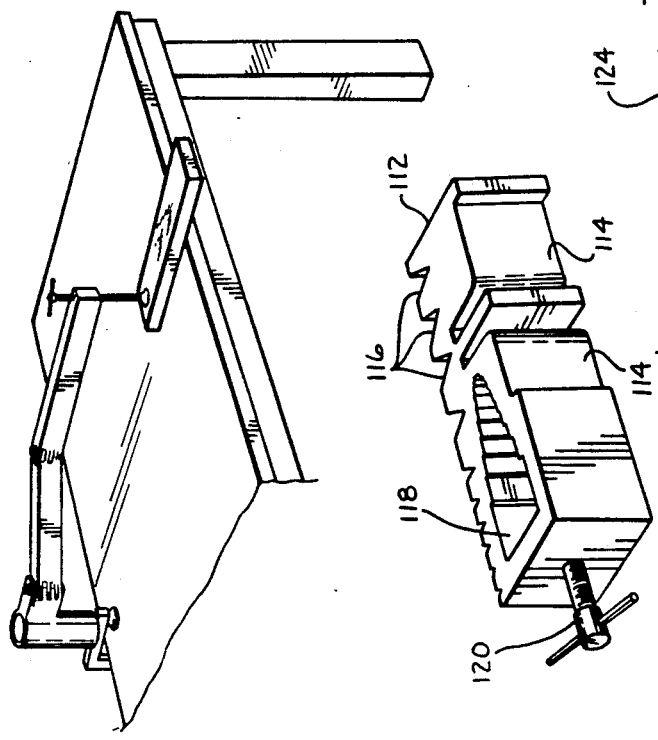

DRILL PRESS CLAMP

BACKGROUND OF THE INVENTION

1. Field of the Invention

The present invention relates in general to work holders. In particular, the present invention relates to an improved drill press clamp.

2. Description of the Related Art

Drill presses have been known for numerous years. Since the beginning of their use it has been necessary to hold the work in proper position beneath the drill head. The work may be held in position by the operator, although this reduces the accuracy of the operation, and may subject the operator to injury.

Numerous devices have been proposed for clamping the work in position on a drill press. U.S. Pat. No. 2,866,367 to Wilkes discloses screw clamps carried on the end of an arm extending horizontally from a sleeve. U.S. Pat. No. 4,505,624 to Kelly, Jr. discloses a work holder mounted to the table of the drill press. The device includes a first arm rotatably extending out from below the table and a second arm rotatably connected to the outer end of the first arm. A free end of the second arm includes a screw which acts as a clamp to hold work pieces on the table.

While these arrangements have proven satisfactory, they lack the adjustability to allow their use with a wide range of diverse work pieces.

SUMMARY OF THE INVENTION

An object of the present invention is to provide a drill press clamp which may be readily employed with a wide variety of work pieces.

Another object of the present invention is to provide a drill press clamp which may be adjusted to engage a work piece at any point on the table and at any height above the table.

A further object of the present invention is to provide a drill press clamp which may be used with a wide variety of drill presses.

Another object of the present invention is to provide a drill press clamp which may be readily modified for use on a standard work table.

Yet another object of the present invention is to provide contoured blocks to be employed with the work holder for securely holding the work.

These and other objects are achieved by a drill press clamp having a collar which may be removably and adjustably mounted on the column of a drill press. A first arm is pivotally connected to the collar at a first end, with the second free end of the first arm pivotally mounting a second arm at a first end of the second arm. The free second end of the second arm includes a screw extending therethrough which may be employed as a clamp to secure a work piece between the drill press table and the second end of the second arm. The pivotal arrangement of the arms allows the clamp at the end thereof to be located at any point above the table. Additionally, the collar may be located at different positions along the column, to allow for work pieces of different sizes.

The device may be adapted for use on a standard work table, without a drill press. The present invention also includes the use of clamp blocks having various contours cut therein. These contours may correspond to common profiles of work pieces, such that the block may be interposed between the clamp on the second arm and the work piece on the table.

BRIEF DESCRIPTION OF THE DRAWINGS

The objects and features of the invention noted above are explained in more detail with reference to the drawings in which like reference numerals denote like elements, and in which:

FIG. 4 is a cross-sectional view taken along the line 4—4 of FIG. 2;

FIG. 5 is a detail perspective view showing the pivotal arm connection;

FIG. 6 is a perspective view showing a second embodiment of a collar according to the present invention;

FIG. 7 is a rear view of the collar of FIG. 6;

FIG. 8 is a top view of a shim employed in the present invention;

FIG. 9 is a cross-sectional view of the collar of FIG. 6, taken along the lines 9—9 of FIG. 6;

FIG. 10 is a perspective view of the present invention adapted for use on a work table;

FIG. 11 is a perspective view showing an adapter for the present invention for table top use; and FIGS. 12 and 13 are perspective views of clamp blocks according to the present invention.

DETAILED DESCRIPTION OF THE INVENTION

Figure 1:
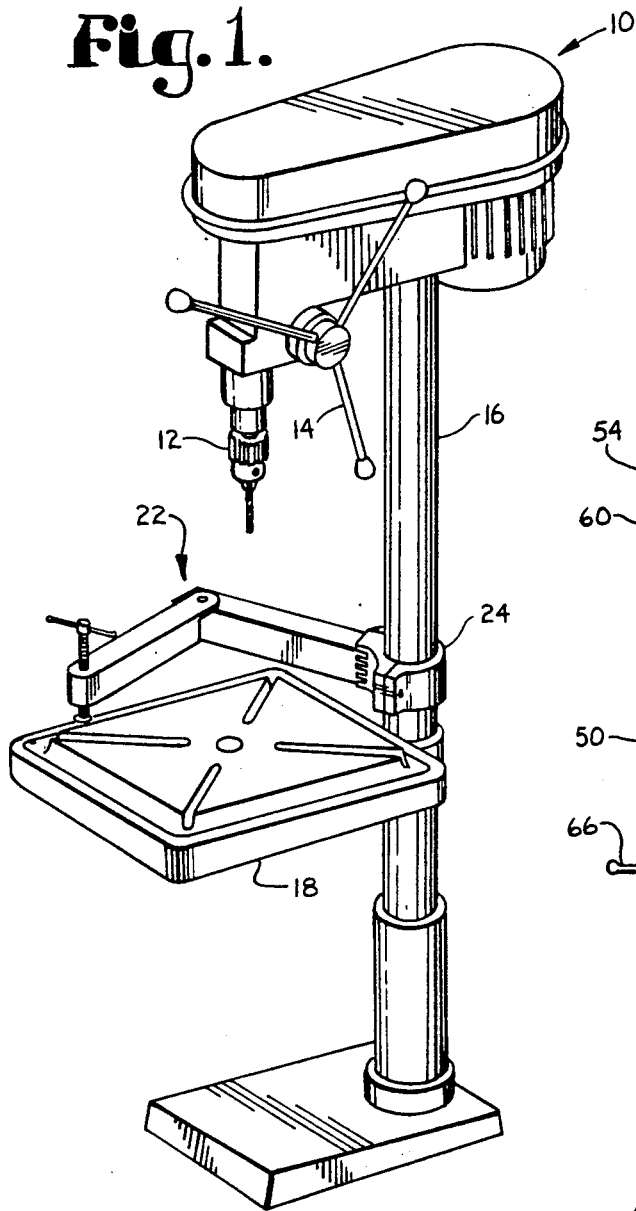
FIG. 1 is a perspective view of the drill press clamp according to the present invention employed with a drill press.

With reference to FIG. 1, a standard drill press is generally designated by reference numeral 10. Drill press 10 includes a chuck 12 adapted to retain a drill bit and a handle 14 for moving the chuck and drill bit towards a work piece. The chuck and handle are supported upon a column 16, which additionally supports a table 18 adapted to receive the work piece thereon. It is noted that drill press 10 may be either a free standing model or a bench mount model, with the main difference being the provision of a rack 20 (FIG. 3) on the free standing model. This rack 20 cooperates with a pinion to allow adjustment of the height of table 18 on column 16.

Figure 3:
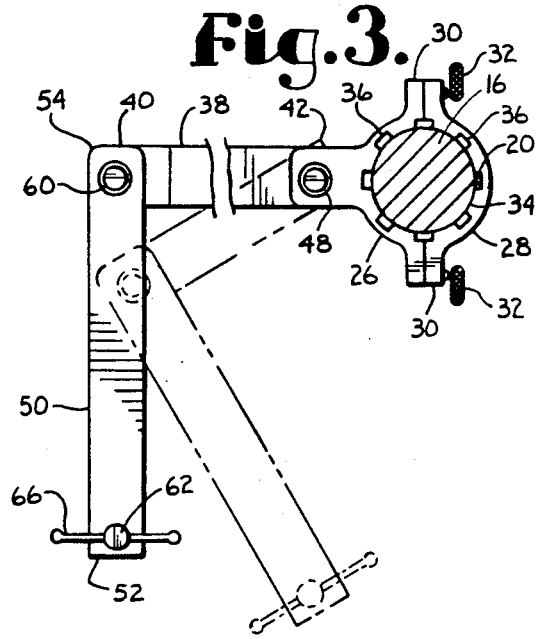
FIG. 3 is a top view of the clamp of FIG. 1.

Beginning with reference to FIG. 1, the device according to the present invention is generally designated by reference numeral 22. The device includes a collar 24 which substantially encircles column 16 to mount device 22 to the drill press 10. As is best shown in FIG. 3, collar 24 is split to form a first segment 26 and second segment 28. Segments 26 and 28 are split along a plane substantially parallel to, and including, the longitudinal axis of the column of the drill press to allow the collar 24 to be placed on, and removed from the column 16. The segments include appropriate mating flanges 30 to allow these segments to be releasably fixed together, as by bolts 32. Bolts 32 preferably have an offset cantilevered portion to allow them to be loosened and tightened by hand.

The assembled segments 26 and 28 define a mounting hole 34 having a diameter slightly smaller than the largest anticipated column diameter. In this manner, the segments 26 and 28 may be placed on either side of column 16 with the column resting within the mounting hole 34. Tightening of the bolts 32 will then fix the collar 24 to the column 16.

Where the drill press 10 includes a rack 20, the rack could interfere with mounting of the collar 24, or mounting of collar 24 could damage the rack 20. As such, at least one of the segments 26 or 28 includes a rack cut out 36. The rack 20 may then be received within the cut out 36 to allow mounting of the collar 24. Preferably, each of the segments includes a plurality of rack cut outs 36, as shown in FIG. 3. In this particular figure, the segments 26 and 28 together define eight rack cut outs 36. The provision of plural cut outs allows the collar 24 to be mounted upon column 16 in a plurality of angular dispositions, as necessitated by the particular work piece.

Figure 2:
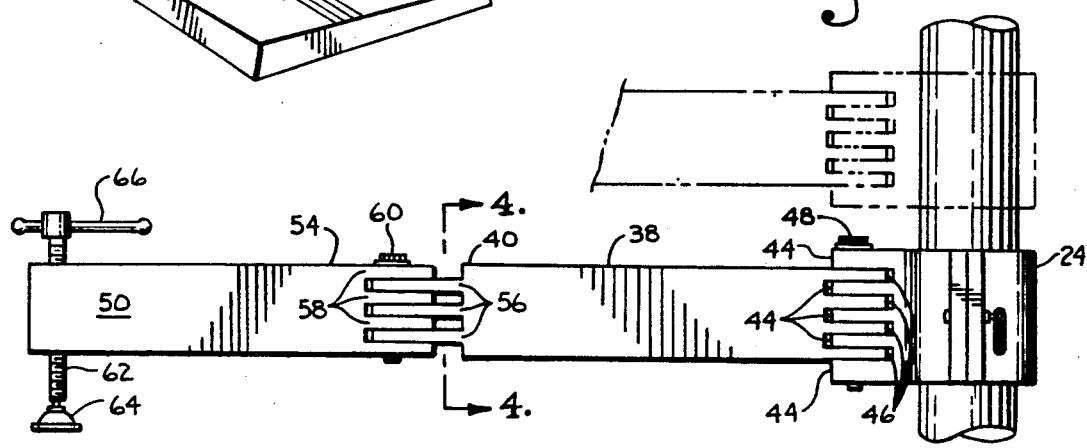
FIG. 2 is a side view of the clamp of FIG. 1.

The height of collar 24, and thus device 22, on column 16 may be adjusted by loosening the bolts 32 until the collar 24 may be easily moved to the desired height, at which point the bolts 32 will be retightened. This vertical position change is illustrated by the dashed lines in FIG. 2.

The first collar segment 26 includes means allowing a pivotal connection with a primary arm 38, with the pivot axis being substantially parallel to the longitudinal axis of the column of the drill press. As shown in FIG. 3, primary arm 38 includes a first end 40 and a second end 42. The pivotal connection between primary arm 38 and first collar segment 26 is at the second end of primary arm 38.

While any well known means allowing a pivotal connection between these elements may be used, it is preferred that first collar segment 26 include a plurality of cantilevered tongues 44 which are spaced from each other to define grooves therebetween. The second end 42 of primary arm 38 includes a plurality of mating tongues 46, also spaced to define grooves, and sized to fit easily within the grooves defined by the tongues 44. A through-hole extends through each of these tongues, and an appropriate pin is inserted in this through hole to define this pivotal connection.

It is also preferable that this connection be selectively pivotal, such that the angular position of primary arm 38 with respect to collar 24 may be releasably fixed. To this end, the pin extending through the through hole in the tongues 44 and 46 may take the form of a pivot bolt 48. Pivot bolt 38 may be threaded to a nut on the side thereof opposite its head, or may be threaded to the lowermost of the tongues 44 or 46. In this manner, the bolt 48 may be rotated to compress the tongues 44 and 46 into tight engagement.

The use of a plurality of tongues ensures an extremely large amount of surface contact providing a proportionately large amount of static friction to tightly fix the angular position of primary arm 38 with respect to collar 24. For ease of operation, it is preferred that the bolt 48 include a knurled head or other means to allow manual rotation of bolt 48 to fix and release the angular position of primary arm 38.

The device 22 also includes a secondary arm 50 having a first end 52 and a second end 54. The second end 54 of secondary arm 50 and the first end 40 of primary arm 38 are pivotally connected to allow angular rotation of secondary arm 50 with respect to primary arm 38 about a pivot axis substantially parallel to the longitudinal axis of the column of the drill press. As before, this pivotal connection may be provided by any well known means in the art, but it is preferably formed of a tongue and groove configuration similar to the connection between primary arm 38 and collar 24.

Specifically, the first end 40 of primary arm 38 includes a plurality of cantilevered tongues 56 spaced from each other to define grooves therebetween. Second end 54 of secondary arm 50 includes a plurality of mating tongues 58 cantilevered therefrom and spaced to define grooves. The tongues 56 and 58 each include a through hole extending therethrough which may receive a pin to allow the pivotal connection.

As before, it is preferred that this pivotal connection be selectively pivotal, and as such a pivot bolt 60 may advantageously form such a pin to allow the interlocking tongues to be compressed together in a manner similar to that previously described. Also as before, it is preferred that pivot bolt 60 include appropriate knurling or other means to allow the tightening and loosening of this bolt manually.

The first end 52 of secondary arm 50 includes an appropriate clamp means mounted thereon to apply pressure towards the table 18. Such a clamp means may be advantageously formed by a threaded hole extending through end 52 with a clamp bolt 62 threadingly engaged therein. Clamp bolt 62 preferably includes a work engaging foot 64, which may be pivotally connected to clamp bolt 62, and appropriate means, such as clamp bar 66, allowing manual rotation of clamp bolt 62 with respect to secondary arm 50.

As may be readily envisioned by a comparison of FIGS. 1 and 3, the pivotal connection between primary arm 38 and collar 24, and the pivotal connection between secondary arm 50 and primary arm 38 will allow the free first end 52 of secondary arm 50 to be placed at any point within an extremely large area. The extent of this area is, of course, dependent upon the angular limits of the pivotal connections. For this reason, it is preferred that each pivotal connection allow at least 180° of movement of the associated arm.

With particular regard to FIG. 1, it may be readily seen that the first end 52 of arm 50, and thus the clamp bolt 62, may be positioned at any point above table 18. In addition, by forming the arms 38 and 50 longer than is strictly necessary to reach the furthest point of table 18, the arms will take an oblique angle relative to each other for any position of clamp bolt 62 above table 18. This oblique relative position will have the effect of removing the arms from the work area, improving accuracy and safety.

Although, as noted above, the pivotal connections limit the amount of area circumscribed by free first end 52, the angular position of this area with respect to column 16 may be varied by changing the angular position of collar 24 with respect to column 16. Where the drill press 10 is a free standing model, the rack cut outs 36 allow such an angular positioning of collar 24. While angular positioning of the collar 24 on column 16 may not be strictly necessary to place clamp bolt 62 at a particular location on table 18, it may be preferable due to a particular work piece configuration or to ensure the oblique angle relationship of the arms, as discussed above.

With reference to FIG. 6, a second embodiment of the collar 24 according to the present invention is shown.

Like the previous embodiment of the collar, the collar 68 according to the second embodiment is pivotally connected to the primary arm 38 via spaced tongues 46 extending from the second end 42 of primary arm 38. Also similar to the first embodiment, the collar 68 is formed as a split collar, however the plane of the split includes the pivot axis of the connection between collar 68 and primary arm 38, defined by pivot bolt 48.

As may best be seen in FIG. 9, the collar 68 includes a first segment 70 and a second segment 72. As in the previous embodiment, the segments 70 and 72 define a mounting hole 74 adapted to receive the column 16 of the drill press 10. Unlike the first embodiment, however, first segment 70 includes a plurality of tongues 76 cantilevered outwardly therefrom in spaced relation. Similarly, second segment 72 also includes a plurality of tongues 78 similar to tongues 76 but offset such that the tongues 46 on the primary arm 38 and tongues 76 and 78 on the first and second segments 70 and 72 will form a layered relationship in the operative position shown in FIG. 6.

With this arrangement, the segments of the collar 68 may be rotated about the pivot bolt 48 to open collar 68 such that it may be easily placed on, or removed from, the column 16. This embodiment eliminates the risk of losing the second segment 28 of the collar of the first embodiment. To maintain the collar 68 in the closed position, each of the segments includes a flange 80 which includes a through hole. A locking bolt 82, or other appropriate means, may extend through the through hole to fix the flanges in operative proximity.

FIGS. 6 and 9 also show an additional element of the present invention, which is a shim 84. Shim 84 allows the collar 24 or 68 to be employed with drill presses 10 having columns 16 of a smaller diameter.

Shim 84 is shown alone in FIG. 8. It may be seen that shim 84 generally comprises first and second portions 86 and 88, with each of these portions including a semi-circular shim body 90. Where the shim 84 is to be used with a collar having one or more rack cut outs, the shim bodies 90 may include a corresponding number of cut out lugs 92 extending radially outwardly from the shim bodies 90 for mating relationship with the rack cut outs. One or more of the cut out lugs 92 may include a shim rack cut out 93 adapted to receive the rack on the column.

The shim portions 86 and 88 may simply be placed within the appropriate segments of the collar prior to mounting on the column 16. When the collar is mounted to the column, the shim 84 will be disposed between the column 16 and the collar, thus allowing the collar to be used with columns having a diameter smaller than the mounting hole of the particular collar.

While the shim 84 may be formed of a metal, a rubber or plastic material be used to insure a proper fit. It may also be found that it is preferable that the portions 86 and 88 of the shim securely engage each other when in the operative position. To this end, the shim portions 86 and 88 may include interlocking protrusions 94 and cavities 96.

Although not shown, other arrangements are available to form the ship rack cut out 93 in addition to the reduced radial thickness portion shown in FIG. 8. For Example, the shim 84 may be formed as a monolithic unit having a single shim body 90 and a plurality of cut out lugs 92, with one cut out lug, and the adjacent portion of shim body, removed therefrom such that the shim 84 forms a partial circle. The rack 20 on the column 16 would thus extend outwardly of the shim 84 at the removed portion.

A further embodiment of the present invention is shown in FIG. 11. This embodiment is similar to those previously described in that it includes a primary arm 38, secondary arm 50 and clamp bolt 62 all arranged as previously described. However, in this embodiment the second end 42 of primary arm 38 pivotally connects to an adapter 98. The adapter 98 generally takes the form of an elongated member 100 which, similar to the first collar embodiment 24, includes a plurality of tongues 102 extending outwardly therefrom for layered engagement with the tongues 46 of primary arm 38, as in the previous embodiments.

The elongated member 100 also includes at least one, and preferably two, connecting members 104. As shown in FIG. 11, the connecting members 104 may take the form of cylindrical segments extending outwardly from the elongated member 100. The connecting member 104 is adapted to receive various mounting elements for the device 22.

As shown in FIG. 11, these mounting elements may take the form of C-clamps 106 having connecting elements 108 fixed thereto. The connecting elements 108 are adapted to mate with the connecting member 104. In the embodiment shown, the connecting element 108 will take the form of a cylindrical member having an outer diameter slightly smaller than the inner diameter of the cylindrical member forming the connecting member 104. The connecting member 104 would include appropriate means to lock the connecting elements in mating relationship, which may advantageously take the form of a set screw 110.

This arrangement allows the device 22 to be used in environments other than that of a drill press. For example, as shown in FIG. 10, a C-clamp 106 could be connected to the device 22 by means of the connecting member and connecting element, such that the device 22 could be releasably fixed to a work table having a substantially planar horizontal surface. As may be readily recognized from the embodiment shown in FIG. 11, other arrangements of the C-clamp orientation with respect to the device 22 are possible such that the C-clamp could be releasably fixed to a substantially vertical planar member, such as a back stop adjacent a work table.

The arrangement shown in FIG. 11 may also be used with a drill press as in the previous embodiments, by the provision of a collar 24 having a connecting element 108 fixed thereto. Used in this manner, the collar is pivotally connected to the primary arm via the adapter 98. While the first embodiment of collar 24 has been shown in FIG. 11, it should be evident that the second embodiment of the collar could also be used, with the hinge axis for the collar segments being spaced from the connecting element 108.

To further enhance the variety of work which may be easily used with the device 22, the device may be used in combination with a work engaging member 112, shown in FIG. 12. The work engaging member 112 takes the general form of a block, with numerous exterior cut outs formed in the outer surfaces thereof. For example, the member 112 may include a pair of angle cut outs 114 adapted to conform to the cross sectional configuration of standard angle members.

Another surface of the member 112 may include triangular exterior cut outs which may be placed over a pipe or bar having a circular outer configuration. This would result in the bar or pipe being contacted at two points, rather than a single point as by the foot 64, increasing the friction retaining the bar or pipe in position. A further means to handle circular pipe or bars would be a tapered interior cut out 118 extending through the body of the work engaging member 112. At the end of the cut out opposite the taper, an engagement screw 120 could be threaded such that a circular pipe or bar extending through the tapered cut out 118 would be engaged by the screw 120 and fixed in position within the cut out 118.

In operation, the work would be engaged by the appropriate cut out on the work engaging member 112, with the work being placed between the work table and the member 112 (or a portion of the member 112, in the case of the interior cut out). The device 22 would then be configured such that the clamp bolt 62 is above the work engaging member 112. The clamp bolt 62 would then be rotated such that the foot 62 securely clamps the work engaging member, and thus the work, against the work table.

A second embodiment of the work engaging member 112 is shown in FIG. 13 and is designated by reference numeral 112'. As with the first embodiment, the engaging member 112' includes a plurality of exterior cut outs, including rectangular cut outs 122 adapted to engage bars or pipes of rectangular cross section. A separate face of the engaging member 112' may include rectangular cut outs having further triangular cut outs at the top end thereof, as designated by reference numeral 124. Also, as in the first embodiment, the engaging member 112' may include a tapered interior cut out 118' with engagement screw 120'. This second embodiment would be employed as with the first embodiment.

While the present invention has been described with regard to specific embodiments, it should be apparent that various modifications could be made. For example, the number of layered tongues forming the pivots between the arms and collar may be different than that shown in the drawings. The particular arrangement of the connecting members 104 on the elongated member 100 could also be different than that shown. Also, the number and shape of the cut outs provided on the work engaging members could, of course, be different.

From the foregoing it will be seen that this invention is one well adapted to attain all ends and objects hereinabove set forth together with the other advantages which are obvious and which are inherent in the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

What is claimed is:

1. A work holder, comprising:
   a collar adapted to be mounted in substantially surrounding relation on a column of a drill press above a work table of the drill press;
   a primary arm having first and second ends, said second end of said primary arm being pivotally connected to said collar for pivoting about an axis substantially parallel to the longitudinal axis of the column;
   a secondary arm having first and second ends, a second end of said secondary arm being pivotally connected to said first end of said primary arm for pivoting about an axis substantially parallel to the longitudinal axis of the column; and
   clamp means mounted on said first end of said secondary arm and adapted to apply a force to a work piece resting on the work table of the drill press such that the work piece is clamped between said clamp means and the work table.

2. A work holder as in claim 1, wherein said pivotal connection between said associated arms and collar are formed by:
   a plurality of cantilevered tongues spaced along said pivot axes and extending outwardly from said respective arms and collars, said tongues of said pivotally connected arms and collar being arranged in an overlapping layered arrangement; a through-hole extending through each of said overlapping layered arrangements of said tongues; and
   a pivot bolt extending through each of said through-holes, whereby said pivot bolts define said pivot axes.

3. A work holder as in claim 2, further comprising:
   means associated with each said pivot bolt allowing each said overlapping layered arrangement of tongues to be releasably compressed together, whereby static friction will prevent pivoting about said respective pivot bolt.

4. A work holder as in claim 1, wherein said clamp means comprises:
   a threaded clamp bolt threadingly extending through said first end of said secondary arm, whereby an end of said clamp bolt nearest the work table may be moved selectively towards and away from the work table by rotation of said clamp bolt with respect to said secondary arm.

5. A work holder as in claim 4, wherein said pivotal connection between said associated arms and collar are formed by:
   a plurality of cantilevered tongues spaced along said pivot axes and extending outwardly from said respective arms and collars, said tongues of said pivotally connected arms and collar being arranged in an overlapping layered arrangement;
   a through-hole extending through each of said overlapping layered arrangements of said tongues; and
   a pivot bolt extending through each of said through-holes, whereby said pivot bolts define said pivot axes.

6. A work holder as in claim 5, further comprising:
   means associated with each said pivot bolt allowing each said overlapping layered arrangement of tongues to be releasably compressed together, whereby static friction will prevent pivoting about said respective pivot bolt.

7. A work holder as in claim 1, wherein said collar includes a mounting hole therein adapted to receive the column of the drill press, said mounting hole including at least one rack cutout in the general form of a groove extending substantially parallel to the longitudinal axis of the column of the drill press, said rack cutout adapted to receive a worktable height adjustment rack therein.

8. A work holder as in claim 7, wherein said collar includes a plurality of said rack cutouts, each of said cutouts being spaced about the periphery of said mounting hole.

9. A work holder as in claim 8, further comprising:
   a shim located within said mounting hole, said shim having an outer periphery substantially corresponding to said mounting hole, and having a shim mounting hole adapted to receive the column of the drill press therein, said shim further including a shim rack cutout defined by a portion of at least reduced radial thickness extending substantially parallel to the longitudinal axis of the column of the drill press and adapted to receive the work table height adjustment rack therein.

10. A work holder as in claim 1, further comprising:
a shim located within said mounting hole, said shim having an outer periphery substantially corresponding to said mounting hole, and having a shim mounting hole adapted to receive the column of the drill press therein.

11. A work holder as in claim 1, wherein said collar is formed of first and second collar segments, said collar segments mating along a plane substantially parallel to and containing the longitudinal axis of the column of the drill press to form said collar, and said collar further including means for releasably maintaining said collar segments mated to form said collar.

12. A work holder as in claim 11, wherein said plane includes said pivot axis between said collar and said primary arm, and wherein each of said collar segments is pivotally connected to said primary arm at said pivot axis between said collar and said primary arm.

13. A work holder as in claim 1, further comprising:
an adapter having at least one connecting member adapted to releasably fix a connecting element thereto, said adapter being pivotally connected to said second end of said primary arm;
and wherein said collar includes a connecting element fixed thereto and releasably fixed to said connecting member, said collar being pivotally connected to said second end of said primary arm via said adapter;
and said work holder further comprising, in combination:
at least one C-clamp, each said C-clamp including at least one of said connecting elements.

14. A work holder as in claim 13, wherein said adapter includes more than one said connecting member.

15. A work holder as in claim 1, in combination with:
a work engaging member adapted to be placed between said clamp means and the work piece, said work engaging member having the form of a block with a plurality of exterior surfaces, with at least one exterior cut out portion formed in at least one of said exterior surfaces and extending between adjacent ones of said exterior surfaces, and further including an interior cut out portion extending through said block, said interior cutout portion having an interior wall forming a concave taper reducing in a direction away from a first one of said exterior surfaces, and an engagement screw threadingly engaged with said block in said first exterior surface and extending toward said concave tapered interior wall.

16. The combination of claim 15, wherein said exterior cut out portions are formed on more than one of said exterior surfaces, and wherein at least one of said exterior cutout portions on one of said exterior surfaces corresponds to the cross-sectional configuration of a standard size angle member.

17. The combination of claim 16, wherein at least one of said exterior cut out portions on another of said exterior surfaces includes a pair of walls extending obliquely into said block to form a triangular configuration.

18. The combination of claim 16, wherein at least one of said exterior cut out portions on another of said exterior surfaces has a substantially rectangular configuration.

* * * * *